Patented June 4, 1929.

1,715,430

UNITED STATES PATENT OFFICE.

MAXIMILIAN P. SCHMIDT AND WILHELM NEUGEBAUER, OF BIEBRICH-ON-THE-RHINE, GERMANY, ASSIGNORS, BY MESNE ASSIGNMENTS, TO GRASSELLI DYE-STUFF CORPORATION, OF NEW YORK, N. Y., A CORPORATION OF DELAWARE.

MANUFACTURE OF VAT DYESTUFFS.

No Drawing. Application filed December 17, 1923, Serial No. 681,273, and in Germany December 27, 1922.

The present invention relates to new vat dyestuffs containing a perylene nucleus and to a process for preparing the same.

We have found that new highly valuable vat dyestuffs are obtained by causing a compound of the general formula:

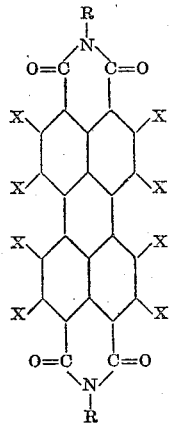

wherein X represents hydrogen, but at least one X represents a negative substituent such as halogen, a nitro group etc. and R represents hydrogen, alkyl or phenyl, to be acted upon by a hydrocarbon being substituted by a substituent of the group including —OH, —SH and —NH$_2$.

The reaction probably proceeds in such a manner that the negative substituent of the perylene nucleus reacts with the hydrogen atom of the —OH, —SH and —NH$_2$ group of the hydrocarbon.

As is more fully stated in the examples aliphatic as well as aromatic hydrocarbons are operative, provided they are substituted by a substituent of the above mentioned group.

Preferably we carry out our process in the presence of a small amount of an acid binding substance such as potassium hydroxide.

The compounds of the above given formula to be used as starting materials are obtainable in several ways. For instance, compounds being substituted by at least one nitro group are described in the German patent specification No. 276,358 and compounds being substituted by halogen in the German patent specification No. 280,830. Other derivatives may be produced, for instance, by treating the diimides of perylenetetracarboxylic acid with halogen under pressure or in the presence of chloro-sulfonic acid.

The following examples illustrate the manner in which the process may be performed. The parts are by weight.

*Example I.*—2 parts of the diimide of dichloroperylenetetracarboxylic acid obtainable by chlorinating the diimide of perylenetetracarboxylic acid under pressure, are heated during about 8 hours with 20 parts of phenol and 3 parts of potassium hydroxide. The mass is then treated with a diluted soda-lye, filtered and washed. The remaining coloring matter forms a blue vat and dyes cotton violet-blue. The dyestuff contains only a very small quantity of chlorine. The fastness to chlorine is very good.

*Example II.*—3 parts of the brominated dyestuff, obtainable by bromination of the diimide of perylenetetracorboxylic acid under pressure, are heated during about 12 hours in the oil-bath to 200–210° centigrade with a mixture of phenolate and phenol prepared from 2,5 parts of metallic sodium and 50 parts of phenol. The mass is treated with a diluted soda-lye, filtered, washed and dried. The dyestuff forms a blue-violet vat and dyes cotton a little redder than the coloring matter obtained according to Example I. The fastness to chlorine is good.

*Example III.*—3 parts of the diimide of dichloroperylenetetracarboxylic acid (cfr. Example I) are boiled with 30 parts of p-toluidine and 4 parts of calcinated sodium-carbonate during about 15 hours. The mass is introduced into diluted hydrochloric acid, filtered and washed until neutral reaction takes place. The dyestuff dyes cotton from the violet-blue vat a bordeaux of a very good fastness.

*Example IV.*—1,5 parts of the diimide of dichloroperylenetetracarboxylic acid are heated to boiling point with 30 parts of alcohol of 95% and 3 parts of potassium hydroxide during about 12 hours. The mass is diluted with water, filtered and washed with water. The coloring matter dyes cotton in bordeaux shades of a good fastness.

*Example V.*—3 parts of the dyestuff obtainable by chlorination of the diphenyl diimide of perylenetetracarboxylic acid are boiled during about 6 hours with 50 parts of phenol and 5 parts of potassium hydroxide. The mass is then treated with diluted soda-lye, filtered and washed. The reaction-product dyes cotton in bordeaux shades whereas the initial product yields yellowish-red shades.

*Example VI.*—10 parts of the blue-violet vat-dyestuff (obtainable by chlorinating in chlorosulfonic acid, or fuming sulphuric acid, the anhydride of perylenetetracarboxylic acid and condensing the tetrachloro-compound with o-phenylene-diamine advantageously in glacial acetic acid) and having the following probable constitution

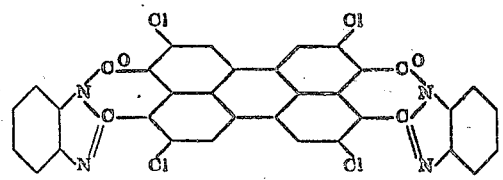

are heated to the boiling point and kept there for about 9–10 hours with about 10 parts of phenol and about 10 parts of potassium hydroxide in a vessel fitted with devices for cooling and stirring.

The reaction-product may be isolated by treating the melt with diluted soda-lye for the purpose of dissolving the phenol, whereupon the mass is filtered washed and dried. The dyestuff is a bluish-black powder soluble in concentrated sulfuric acid with a blue color, forming a greenish-blue hydrosulfite vat, from which cotton is dyed in fast blue tints. The initial coloring matter dyes a blue-violet.

*Example VII.*—3 parts of the nitro-coloring matter obtainable by nitrating for a short time perylene-tetracarboxylic acid diimide with concentrated nitric acid according to the process described in Example 1 of the German patent specification 276,358 (diimide of the nitroperylenetetracarboxylic acid) are heated with a mixture of phenolate and phenol prepared from 3 parts of metallic sodium and 50 parts of phenol to about 200–210° C. during about 8 hours in the oil-bath. The reaction-product is isolated by introducing it into diluted soda-lye, filtrating, washing and drying. The dyestuff obtained dyes cotton violet shades of a good fastness to chlorine.

We claim:

1. The process which comprises condensing a compound of the general formula:

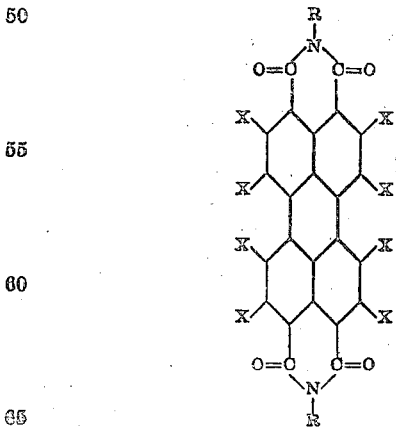

wherein X represents hydrogen but at least one X represents a negative substituent and R represents hydrogen, alkyl or phenyl, with a hydrocarbon being substituted by a substituent of the group including —OH, —SH and —NH$_2$.

2. The process which comprises causing a compound of the general formula:

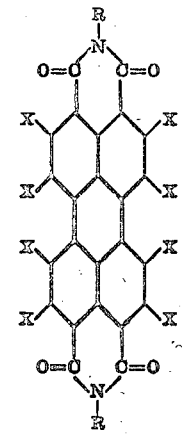

wherein X represents hydrogen but at least one X represents halogen and R represents hydrogen, alkyl or phenyl, to be acted upon by a hydrocarbon being substituted by a substituent of the group including —OH, —SH and —NH$_2$.

3. The process which comprises causing a compound of the general formula:

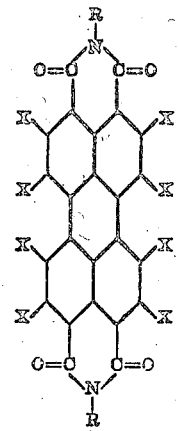

wherein X represents hydrogen but at least one X represents chlorine and R stands for hydrogen, alkyl or phenyl, to be acted upon by a hydrocarbon being substituted by a substituent of the group including —OH, —SH and —NH$_2$.

4. The process which comprises condensing with a phenol a compound of the general formula:

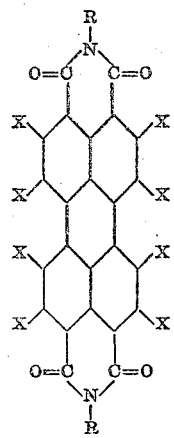

wherein X represents hydrogen but at least one X represents a negative substituent and R stands for hydrogen, alkyl or phenyl.

5. The process which comprises condensing with a phenol a compound of the general formula:

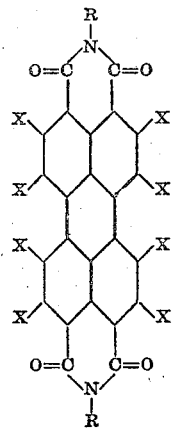

wherein X represents hydrogen but at least one X represents halogen and R stands for hydrogen, alkyl or phenyl.

6. The process which comprises condensing with a phenol a compound of the general formula:

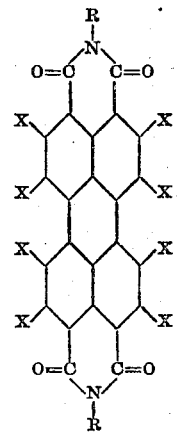

wherein X represents hydrogen but at least one X represents chlorine and R stands for hydrogen, alkyl or phenyl.

7. As new products the vat dyestuffs of the general formula:

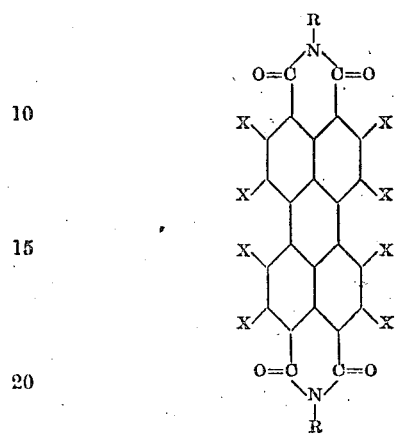

wherein R represents hydrogen, alkyl or phenyl and X represents hydrogen but at least one X represents a monovalent substituent of the group: OR', SR', NHR' in which R' stands for a hydrocarbon residue, said dyestuffs being dark-brown to black powders forming new vats from which the fiber is dyed red to blue tints.

8. As new products the vat dyestuffs of the general formula:

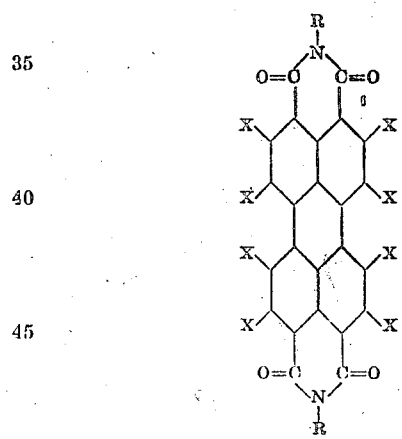

wherein R represents hydrogen, alkyl or phenyl and X stands for hydrogen but at least one X represents the phenoxy group.

9. As a new product the vat dyestuff being obtainable by condensing the diimide of the dichloro perylene carboxylic acid with phenol forming a blue vat from which cotton is dyed violet-blue tints.

10. As new products the vat dyestuffs of the following formula

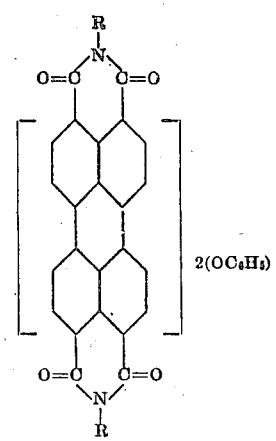

wherein R represents hydrogen, alkyl or aryl.

11. As new products the vat dyestuffs of the following constitution:

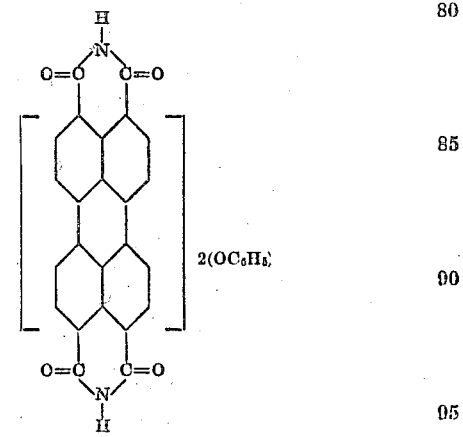

In testimony whereof we have signed our names to this specification.

MAXIMILIAN P. SCHMIDT.
WILHELM NEUGEBAUER.